United States Patent [19]

Iino et al.

[11] Patent Number: 5,467,103
[45] Date of Patent: Nov. 14, 1995

[54] DISPLAY APPARATUS

[75] Inventors: Tadashi Iino; Yoshiyuki Furuya; Kunimitsu Aoki, all of Shizuoka, Japan

[73] Assignee: Yazaki Corporation, Tokyo, Japan

[21] Appl. No.: 128,073

[22] Filed: Sep. 29, 1993

Related U.S. Application Data

[63] Continuation of Ser. No. 812,991, Dec. 24, 1991, abandoned.

[30] Foreign Application Priority Data

Dec. 26, 1990 [JP] Japan .................. 2-404671

[51] Int. Cl.$^6$ .......................................... G09G 3/02
[52] U.S. Cl. .................. 345/7; 359/360; 340/980
[58] Field of Search .................. 345/7, 9, 102; 340/980; 358/236, 341; 359/13, 630, 632

[56] References Cited

U.S. PATENT DOCUMENTS

| | | | |
|---|---|---|---|
| 3,915,548 | 10/1975 | Opittek et al. | 340/705 |
| 4,760,389 | 7/1988 | Aoki et al. | 340/784 |
| 4,809,078 | 2/1989 | Yabe et al. | 345/102 |
| 5,121,099 | 6/1992 | Hegg et al. | 340/705 |

FOREIGN PATENT DOCUMENTS 61-211139  9/1986  Japan .................. 340/705

*Primary Examiner*—Ulysses Weldon
*Assistant Examiner*—Amare Mengistu
*Attorney, Agent, or Firm*—Armstrong, Westerman, Hattori, McLeland and Naughton

[57] ABSTRACT

A display apparatus has a first image emitting unit reflecting external light and a second image emitting unit emitting a second image towards the first image emitting unit. The second image is reflected by the first image emitting unit substantially in the same direction as the first image is emitted from the first image emitting unit. A reflection member reflects the first and second images in a predetermined direction, for example, towards a viewpoint of driver in case of application for automobiles. The reflected images may be observed as a superimposed virtual image. The superimposed virtual image is easy for an observer to focus thereon, resulting in high visibility of displayed image.

17 Claims, 2 Drawing Sheets

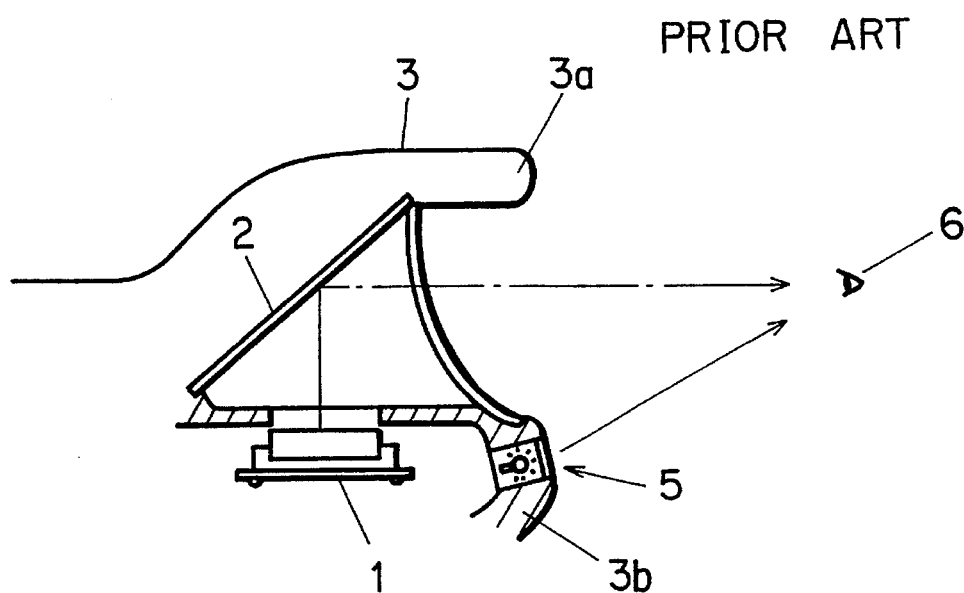
FIG. 3 PRIOR ART
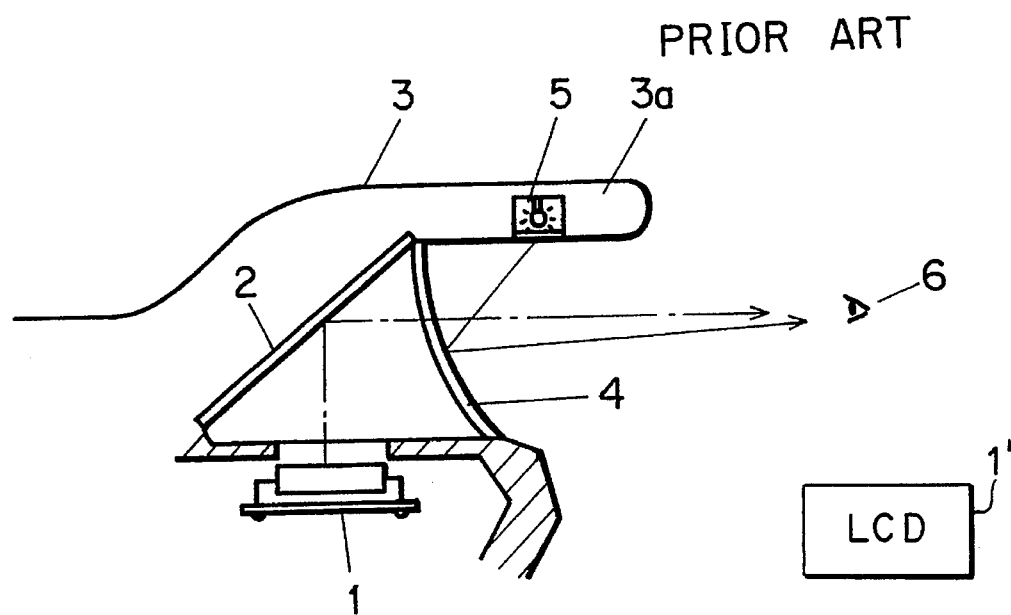
FIG. 4 PRIOR ART
FIG. 5

DISPLAY APPARATUS

This application is a continuation of application Ser. No. 07/812,991 filed Dec. 24, 1991, now abandoned.

BACKGROUND OF THE INVENTION

1. Field of the Invention

The present invention relates to a display apparatus. More particularly, the invention relates to a display apparatus properly applicable for automobiles, in which a displayed image is observed via a reflection member such as a mirror as a virtual image.

2. Description of the Related Background Art

There are conventional display apparatus for automobiles to let a driver visually recognize driving information of a speedometer, a tachometer, and others, in which a display unit is installed on a dash board plane such that the driver can observe the displayed image of the display unit as a direct real image. The display apparatus of this type have such a problem that the external light from windows of automobile reflects on the surface of display unit to shine, thereby disturbing the driver's view. Also, there is another inconvenience that the driver requires a substantial time to focus on the display unit upon sudden change of view from an outside view to the display unit because the distance is short between the driver and the display surface of display unit.

For this reason, there are used display apparatus of a type as shown in FIG. 3 in which a light emission type display unit 1 comprising fluorescent display tubes is disposed in a dash board 3 such that a display surface 1a faces up, and a mirror 2 is disposed as a reflection member such that a reflection surface thereof faces the display surface 1a of the display unit 1, whereby the external light is prevented from directly impinging on the display unit 1 and the mirror 2 reflects the display light of the display unit 1 towards a viewpoint 6 of a driver, so that the driver may observe a virtual image of the displayed image of the display unit 1 far beyond the mirror 2.

The automotive display apparatus of this type has a telltale unit 5 for indication of warning, usually installed in a meter pad 3b of the dash board 3 as shown in FIG. 3, whereby the warning indication may directly be seen by the driver. FIG. 4 shows another example in which the telltale unit 5 is mounted in the meter hood 3a of the dash board 3 to face downward so that light from the unit is reflected at a transparent front plate 4 made of glass or acrylic resin then to be led to the viewpoint 6 of driver. The image is seen as a virtual image by the driver.

The conventional automotive display apparatus as shown in FIG. 3 shows a virtual image of display of speedometer and etc. of the display unit 1 at a distance, but has a problem that it is difficult for the driver to focus on the warning indication because the telltale unit 5 is relatively closer, which leads to a substantial difference of display distance. Also, the automotive display apparatus as shown in FIG. 4 is improved in difference of display distance, but requires a precision of parts such as a precision of surface of the front plate made of acrylic resin in order to reflect the light from the telltale unit 5, which results in increase of production cost. It is another problem for both conventional display apparatuses that the mounting position of the telltale unit 5 is separate from that of the display unit 1, which results in uneasiness of assembly.

SUMMARY OF THE INVENTION

It is therefore an object of the present invention to provide a display apparatus with high visibility of displayed image and at a low production cost.

The object of the present invention can be achieved by a display apparatus comprising a first unit for emitting a first image and reflecting external light, a second unit for emitting a second image towards the first unit such that the second image is reflected by the first unit substantially in the same direction as the first image is emitted, and a reflection member for reflecting the first and second images from the first unit in a predetermined direction, whereby the first and second images are observed a superimposed virtual image in the predetermined direction.

It is another object of the present invention to provide a display apparatus for automobiles in which an indication from a telltale unit is superimposed on a display image of speedometer and others of display unit so as to attain high visibility as well as low production cost.

The another object of the present invention can be achieved by a display apparatus for automobiles, comprising a display unit having a display surface to reflect external light and emitting a display image, a reflection member facing the display unit to reflect the display image therefrom towards a viewpoint of driver, and a telltale unit facing the display surface of the display unit and emitting a warning indication towards the display surface such that the warning indication is reflected by the display surface of the display unit and further reflected by the reflection member towards the viewpoint of driver, whereby the warning indication is observed by the driver as superimposed on the display image.

According to the above constitution, the display light emitted from the display unit is reflected by the reflection surface of the reflection member to reach the viewpoint of driver, so that the driver may observe the virtual image of the display image behind the reflection member. Further, the warning light emitted from the telltale unit is reflected by the display surface of the display unit and again reflected by the reflection surface of the reflection member to reach the viewpoint of driver. Consequently, the driver observes both the display image of the display unit and the warning indication of the telltale unit superimposed one on the other as a virtual image.

Further objects and specific features of the present invention will be apparent from the following description of the preferred embodiment of the present invention as illustrated in the accompanying drawings.

BRIEF DESCRIPTION OF THE DRAWING

FIG. 3 is a sectional view of a conventional display apparatus for automobiles;

FIG. 4 is a sectional view of another conventional display apparatus for automobiles.

FIG. 5 schematically depicts an LCD.

DESCRIPTION OF THE PREFERRED EMBODIMENTS

There is a preferred embodiment of the present invention described below with reference to the drawings. The preferred embodiment shows a display apparatus properly applied for automobiles.

Figure 1:
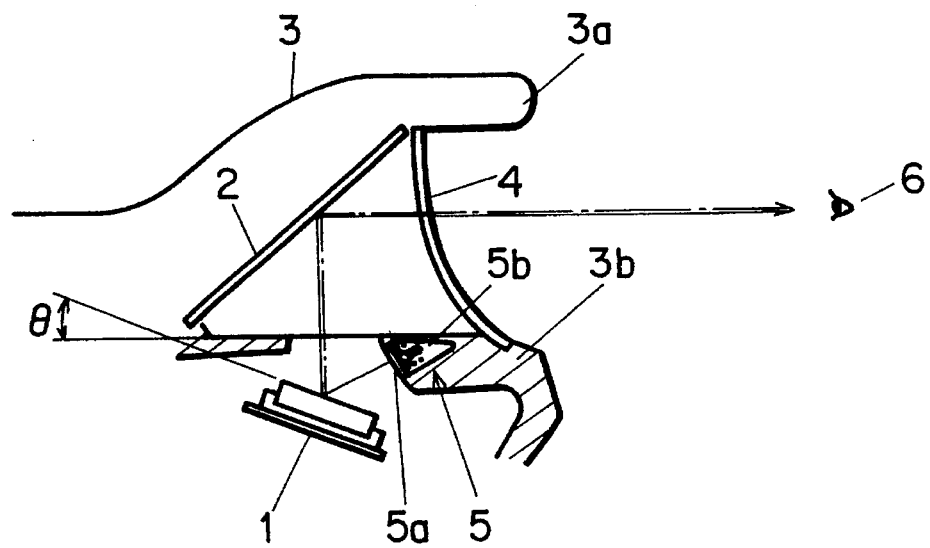
FIG. 1 is a sectional view of an embodiment of a display apparatus applied for an automobile according to the present invention.
Figure 2:
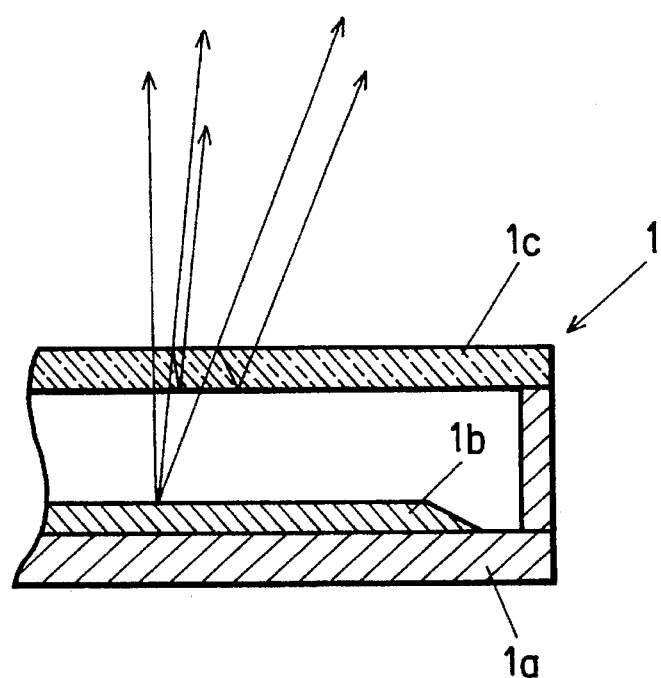
FIG. 2 is a sectional view of fluorescent display tubes as a display unit of the embodiment.

An automotive display apparatus of the preferred embodiment of the present invention, as shown in FIG. 1, is arranged such that a display unit 1 is mounted in the lower portion of a dash board or instrument panel 3. The display unit 1 comprises fluorescent display tubes and is illustrated in more detail in FIG. 2. As seen in FIG. 2, a fluorescent light emission portion 1b is mounted on a base plate 1a and covered by a transparent front glass 1c.

The display unit 1 is so disposed that the display surface of front glass 1c faces up and is inclined by an angle θ with respect to the horizon towards the driver. In case of using the fluorescent display tubes for the display unit 1, a part of display light emitted from the fluorescent light emission portion 1b is reflected at the front face of the front glass 1c and further reflected at the back face of the glass 1c then to pass the front face of the glass 1c as shown in FIG. 2, reaching the driver, who will observe a doubled image. For this reason, the above-mentioned angle θ is adjusted to a predetermined value to prevent the reflected light, which causes the doubled image to be observed by the driver, from reaching the driver's viewpoint 6. It should be noted that other display means such as a liquid crystal display element with a back light as shown in FIG. 5 may also be used instead of the fluorescent light display tubes as described above.

Further, a mirror 2 is disposed in the upper part of the dash board 3 as a reflection member. The mirror is inclined such that its reflection surface faces the display surface of the display unit 1 to reflect the display light of the display unit towards the driver's viewpoint 6.

Furthermore, a telltale unit 5 is mounted at the inner edge of meter pad 3b of dash board 3 to face the display surface of the display unit 1. The telltale unit 5 indicates warnings such as oil exhaustion, parking brake, etc. The unit 5 normally comprises a colored filter 5a and a light emitting bulb 5b, which point-radiates for the indication based on a control signal of an unrepresented control unit.

An angle may be defined between the plane of filter 5a of the telltale unit 5 and the display surface of the display unit 1 such that an optical axis of light normally emitted from the center of filter plane of the telltale unit 5 is incident on the center of display surface of the display unit 1 approximately with the angle $\theta_1$ with respect to the center thereof. Thus, when the telltale unit 5 is switched on, the light thereof is reflected at the front glass 1c, which is the display surface of the display unit 1, and is further reflected by the mirror to reach the driver's viewpoint 6. Therefore, the light from the telltale unit 5 is observed by the driver to be superimposed on the display image of the display unit 1.

Although the front glass 1c of the display unit 1 has the surface with a reflection function, the display luminance of warning indication may be increased either by sticking a reflection film such as a half mirror onto the surface or by applying a reflection membrane treatment to the surface by means of vapor deposition or other techniques. Also, these treatments effectively reduce a doubled image of warning indication due to the thickness of the front glass 1, which in detail is caused by the light passed through the front face of the glass 1c and reflected at the back face thereof to reach the driver's viewpoint 6.

As explained above, according to the present invention, the displayed image of a speed and others, and the warning indication such as oil exhaustion are displayed as a virtual image while superimposed on each other approximately at the same position and distance, whereby it is easy for the driver to adjust the focus of his eyes on the images. This in turn results in high visibility of the images. Also the telltale unit may be uniformly incorporated with the display unit and/or other units, so that assembly thereof is made easy. In addition, the display surface of the display unit is used as a reflection surface for the telltale unit. Such arrangement allows reduction of production cost.

Many widely different embodiments of the present invention may be constructed without departing from the spirit and scope of the present invention. It should be understood that the present invention is not limited to the specific embodiment described in the specification.

What is claimed is:

1. A display apparatus, comprising:

first means for emitting a first image in a first predetermined direction, said first means including a light emission portion sandwiched between a semi-reflective transparent surface and a base plate, said first means reflecting external light impinging on said semi-reflective transparent surface and being oriented at a predetermined angle θ formed with a horizontal line to prevent a doubled image due to the reflected light being observed by a driver;

second means for emitting a second image towards said semi-reflective transparent surface of said first means in a second predetermined direction at an incident angle $\theta_1$ such that said second image is reflected by said semi-reflective transparent surface of said first means in said first predetermined direction, said first and second means being oriented such that said second image is reflected in substantially in the same direction as said first predetermined direction; and reflection means for reflecting the first and second images from said first means in a third predetermined direction; whereby said first and second images are observed along said third predetermined direction as a superimposed virtual image by the driver at the same position.

2. A display apparatus according to claim 1, wherein said first means is a light emitting display unit which emits light as the first image.

3. A display apparatus according to claim 1, wherein said first means is a liquid crystal display unit which displays the first image as a liquid crystal image.

4. A display apparatus according to claim 1, wherein said first means displays driving information of car as the first image, said second means indicates a warning about car conditions as the second image, and said reflection means reflects the images towards a driver's viewpoint.

5. A display apparatus according to claim 1, wherein said second means is uniformly incorporated with said first means and said reflection means.

6. A display apparatus according to claim 1, wherein said reflection means is a mirror.

7. A display apparatus according to claim 1, wherein said first means is inclined by a predetermined angle.

8. A display apparatus according to claim 1, wherein said first means comprises a surface with a half mirror.

9. A display apparatus according to claim 1, wherein said first means comprises a surface with a reflection membrane.

10. A display apparatus for mounting in a dash board of automobiles, comprising:

display means for emitting a first image in a first selected direction, said first means including a light emission portion sandwiched between a semi-reflective transparent surface and a base plate, said first means reflecting external light impinging on said semi-reflective transparent surface and being oriented at a predetermined angle $\theta$ formed with a horizontal line to prevent a doubled image due to the reflected light from being observed by a driver;

reflection means facing said display means to reflect the display image therefrom in a second selected direction towards a viewpoint of a driver; and telltale means facing said semi-reflective transparent surface of said display means and emitting a warning indication in a third selected direction towards said semi-reflective transparent surface at an incident angle of $\theta_1$ such that said warning indication is reflected by said semi-reflective transparent surface of said display means in said first direction, said telltale means being oriented such that said display image is reflected in substantially in the same direction as said first selected direction;

whereby the warning indication is observed along said second selected direction by the driver as being superimposed on said display image at the same position.

11. A display apparatus for automobiles according to claim 10, wherein said display means is a light emission type display tubes.

12. A display apparatus for automobiles according to claim 10, wherein said display means is a liquid crystal display unit to provide the display image of liquid crystal.

13. A display apparatus for automobiles according to claim 10, wherein said telltale means is uniformly incorporated with said display means and reflection means.

14. A display apparatus for automobiles according to claim 10, wherein said reflection means is a mirror.

15. A display apparatus for automobiles according to claim 10, wherein said display means is inclined by a predetermined angle.

16. A display apparatus for automobiles according to claim 10, wherein said display surface of the display means has a film of half mirror.

17. A display apparatus for automobiles according to claim 10, wherein said display surface of the display means has a reflection membrane.

* * * * *